United States Patent
Takeshita et al.

(10) Patent No.: US 8,227,143 B2
(45) Date of Patent: Jul. 24, 2012

(54) FUEL CELL SYSTEM

(75) Inventors: Masahiro Takeshita, Toyota (JP);
Hiroyuki Yumiya, Nagoya (JP);
Katsuki Ishigaki, Handa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 350 days.

(21) Appl. No.: 12/595,155

(22) PCT Filed: Mar. 27, 2008

(86) PCT No.: PCT/JP2008/056655
§ 371 (c)(1),
(2), (4) Date: Oct. 8, 2009

(87) PCT Pub. No.: WO2008/132948
PCT Pub. Date: Nov. 6, 2008

(65) Prior Publication Data
US 2010/0104909 A1 Apr. 29, 2010

(30) Foreign Application Priority Data
Apr. 18, 2007 (JP) .................................. 2007-108793

(51) Int. Cl.
*H01M 8/04* (2006.01)
(52) U.S. Cl. ......... 429/514; 429/513; 429/425; 429/434
(58) Field of Classification Search ........................ None
See application file for complete search history.

(56) References Cited

U.S. PATENT DOCUMENTS
| | | | | |
|---|---|---|---|---|
| 4,318,529 | A | * | 3/1982 | Huelle et al. ..................... 251/11 |
| 2003/0093950 | A1 | * | 5/2003 | Goebel et al. ............... 48/197 R |

FOREIGN PATENT DOCUMENTS
| | | |
|---|---|---|
| JP | 57-204666 U | 12/1982 |
| JP | 1-304668 A | 12/1989 |
| JP | 2-006834 A | 1/1990 |
| JP | 5-114413 A | 5/1993 |
| JP | 5-251102 A | 9/1993 |

(Continued)

OTHER PUBLICATIONS
JP 2000133294 A (English Machine Translation).*

*Primary Examiner* — Ula C Ruddock
*Assistant Examiner* — Scott J. Chmielecki
(74) *Attorney, Agent, or Firm* — Kenyon & Kenyon LLP

(57) ABSTRACT

A fuel cell system has shutoff valves installed between an air flow channel in a fuel cell and the atmosphere. The shutoff valves have valve seats and also have valve discs for sealing in air by coming into contact with the valve seats. The valve discs are adapted to be sucked toward the valve seats by negative pressure in the air flow channel in the fuel cell. The fuel cell system further has an atmosphere release valve installed between the air flow channel in the fuel cell and the shutoff valve and releasing negative pressure in the air flow channel in the fuel cell to the atmosphere. When the fuel cell is started, the shutoff valves are opened after the negative pressure in the air flow channel of the fuel cell is released. Consequently, sealing ability of the shutoff valves when the fuel cell is stopped is improved, and easiness of opening of the shutoff valves when the fuel cell is started is also improved.

6 Claims, 3 Drawing Sheets

FOREIGN PATENT DOCUMENTS

| | | |
|---|---|---|
| JP | 6-094155 A | 4/1994 |
| JP | 2000-003717 A | 1/2000 |
| JP | 2006-024469 A | 1/2000 |
| JP | 2000-133294 A | 5/2000 |
| JP | 2000133294 A * | 5/2000 |
| JP | 2004-213638 A | 7/2004 |
| JP | 2005-129462 A | 5/2005 |
| JP | 2005-150090 A | 6/2005 |
| JP | 2005-195147 A | 7/2005 |
| JP | 2005-347185 A | 12/2005 |
| JP | 2006-172724 A | 6/2006 |
| JP | 2006-210019 A | 8/2006 |
| JP | 2006-221836 A | 8/2006 |
| JP | 2006-329333 A | 12/2006 |
| JP | 2007-078144 A | 3/2007 |
| JP | 2008-047354 A | 2/2008 |

* cited by examiner

FUEL CELL SYSTEM

This is a 371 national phase application of PCT/JP2008/056655 filed 27 Mar. 2008, claiming priority to Japanese Patent Application No. JP 2007-108793 filed 18 Apr. 2007, the contents of which are incorporated herein by reference.

TECHNICAL FIELD

The present invention relates to the configuration of a fuel cell system, and more particularly, to a drive system of a shutoff valve.

BACKGROUND ART

A fuel cell generates electricity by an electrochemical reaction between a fuel and an oxidizer. The fuel cell includes a membrane electrode assembly (MEA) in which a fuel electrode and an oxidizer electrode are arranged opposite each other on respective sides of an electrolyte formed of an ion exchange membrane; a fuel separator in which a fuel supply channel is formed to supply the fuel to the fuel electrode; and an oxidizer separator in which an oxidizer supply channel is formed to supply the oxidizer to the oxidizer electrode. Various gasses are used for the fuel and the oxidizer. For example, hydrogen is used as the fuel, and air containing oxygen is used as the oxidizer in many types of fuel cells. Electricity is generated by an electrochemical reaction therebetween, and in many types of fuel cells water is often generated on the oxidizer electrode.

As shown in, for example, Japanese Patent Publication Laid-open No. 2006-221836, when the operation of such a fuel cell is stopped, air, which serves as an oxidizer gas, remains in the oxidizer supply channel on the side of the oxidizer electrode, and hydrogen, which serves as a fuel gas, remains in the fuel supply channel on the side of the fuel electrode. Meanwhile, in the fuel cell being stopped, cross leakage occurs, wherein hydrogen which serves as the fuel gas moves to the oxidizer electrode through the ion exchange membrane, while oxygen in the air which serves as the oxidizer gas moves to the fuel electrode through the ion exchange membrane. When this cross leakage occurs, hydrogen is bonded to oxygen by a chemical reaction different from a power-generating reaction, so that water is generated.

The reaction between hydrogen and oxygen by the cross leakage stops when oxygen in the air is used up. However, if new air flows into the oxidizer supply channel when the fuel cell is not in operation, the above-mentioned reaction by the cross leakage occurs continuously. Then, catalysts contained in the fuel electrode and the oxidizer electrode deteriorate due to an increase in the potentials of the oxidizer electrode and the fuel electrode in the fuel cell, so that a catalytic performance deteriorates, which leads to a problem of performance deterioration of the fuel cell.

In order to prevent such a performance deterioration of the fuel cell, Japanese Patent Publication Laid-open No. 2006-221836 describes a method wherein normally-closed electromagnetic valves which are closed by the cutoff of a driving power source are provided in conduits at the oxidizer gas inlet and outlet of the fuel cell, whereby the oxidizer electrode is easily sealed even when the fuel cell is not in operation. Furthermore, Japanese Patent Publication Laid-open No. 2000-3717 describes a system which drives a shutoff valve of a fuel cell by air pressure.

Meanwhile, as a shutoff valve for the fuel cell used in some cases, there is a valve type (hereinafter referred to as an upstream opening type) in which a movable part of the valve moves from the downstream side to the upstream side of an oxidizer gas to open the valve. In the valve having such a configuration, if the oxidizer gas flows into a gas passage in the valve, the movable part of the valve is pushed in a valve-closing direction (from the upstream side to downstream side of the flow of the oxidizer gas) by the pressure of the gas, as disclosed in, for example, Japanese Patent Publication Laid-open No. 2006-24469.

The shutoff valves provided at the oxidizer gas inlet and outlet of the fuel cell need to always maintain an open state when the fuel cell is in operation. Thus, in order to ensure the open state of the valves when the fuel cell is in operation, a normally-open valve may be used instead of the normally-closed valve as described in Japanese Patent Publication Laid-open No. 2006-221836. The normally-open valve maintains the open state when a driving source such as a valve opening/closing power source or air source is stopped. In such a normally-open valve, the driving source such as the power source or air source needs to be provided to keep the shutoff valve close when the fuel cell is not in operation. Therefore, when the driving source is stopped, the shutoff valve may open, or closing force may decrease, so that air may leak in.

Furthermore, as the conventional technique described in Japanese Patent Publication Laid-open No. 2000-3717, when the shutoff valve is driven by air pressure, the pressure of the pressurizing air in a pressurizing chamber decreases due to, for example, leakage of air. Thus, the shutoff valve may open, or closing force may decrease, so that air may leak in.

Meanwhile, since the oxidizer gas in the fuel cell contains moisture, the shutoff valve for the oxidizer gas may be firmly fixed or frozen in a closed state if the fuel cell is stopped in a low-temperature environment. When the shutoff valve is an upstream-opening-type valve as in the conventional technique described in Japanese Patent Publication Laid-open No. 2006-24469, the pressure of the oxidizer gas supplied for starting operation acts in a valve-closing direction to hamper the opening of the valve. Consequently, great driving force may be required.

An object of the present invention is to improve sealing properties of a shutoff valve during stoppage of a fuel cell and to improve opening properties of the shutoff valve when the fuel cell is started.

DISCLOSURE OF THE INVENTION

A fuel cell system according to the present invention is characterized by comprising a fuel cell which generates electricity by an electrochemical reaction between a fuel gas and an oxidizer gas; and a shutoff valve provided between an oxidizer gas flow channel in the fuel cell and the atmosphere, wherein the shutoff valve includes a valve seat, and a valve disc which comes into contact with the valve seat to seal in the oxidizer gas, the valve disc being sucked toward the valve seat by negative pressure in the oxidizer gas flow channel in the fuel cell. Preferably, the fuel cell system according to the present invention further comprises a valve open/close driving mechanism attached to the shutoff valve, the valve open/close driving mechanism opening or closing the shutoff valve by a driving source to be supplied, the valve open/close driving mechanism keeping the shutoff valve open when the supply of the driving source is stopped. Preferably, the valve open/close driving mechanism includes a valve-opening pressure chamber and a valve-closing pressure chamber which are supplied with the oxidizer gas, the valve open/close driving mechanism being configured to open and close the shutoff valve by a pressure difference between the pressure chambers. Preferably, the shutoff valves are provided in all passages between the oxidizer gas flow channel in the fuel cell and the atmosphere.

Preferably, the fuel cell system according to the present invention further comprises an atmosphere release valve which is provided between the oxidizer gas flow channel in the fuel cell and the shutoff valve and which releases to the atmosphere the negative pressure in the oxidizer gas flow channel in the fuel cell. Preferably, when the fuel cell is started, the shutoff valve is opened after the atmosphere release valve is opened.

The advantage of the present invention lies that the sealing ability of the shutoff valve when the fuel cell is not in operation can be improved and that easiness of opening of the shutoff valve when the fuel cell is started can be improved.

BEST MODE FOR CARRYING OUT THE INVENTION

Figure 1:
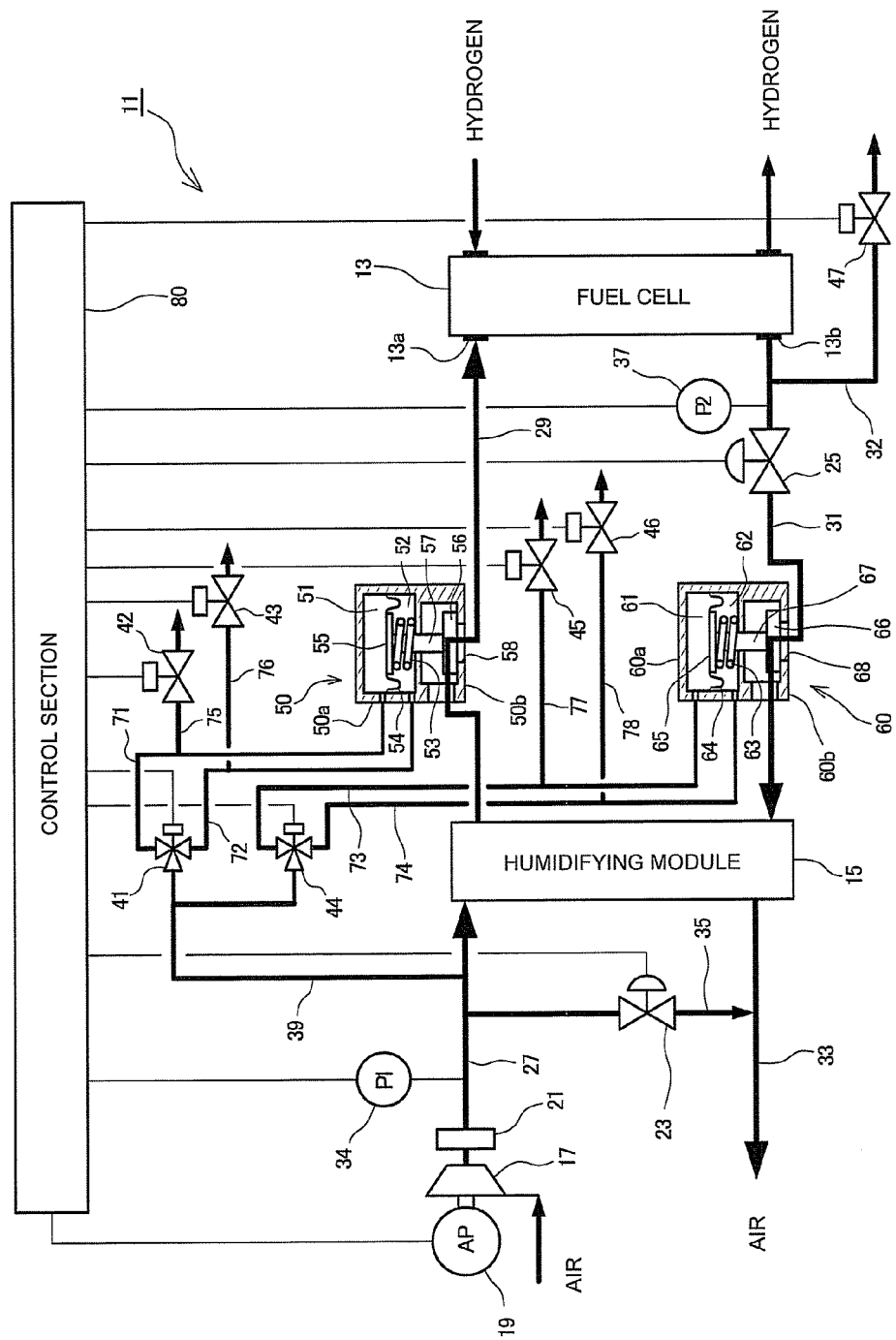
FIG. 1 is a diagram showing the configuration of a fuel cell system according to an embodiment of the present invention.

A preferred embodiment of the present invention will hereinafter be described with reference to the drawings. As shown in FIG. 1, a fuel cell system 11 in the present embodiment comprises a fuel cell 13 which generates electricity by an electrochemical reaction when supplied with hydrogen serving as a fuel gas and air serving as an oxidizer gas, an air compressor 17 which compresses the air supplied to the fuel cell 13, and a humidifying module 15 which humidifies the air supplied to the fuel cell 13. The air compressor 17 and the humidifying module 15 are connected to each other by a compressed air supply pipe 27. The humidifying module 15 and the fuel cell 13 are connected to each other by an air inlet pipe 29 and an air outlet pipe 31. The air inlet pipe 29 guides the air humidified in the humidifying module 15 to an air inlet 13a linked to an air flow channel of the fuel cell 13. The air outlet pipe 31 guides, to the humidifying module 15, the air discharged from an air outlet 13b linked to the air flow channel of the fuel cell 13. An air discharge pipe 33 for discharging the air to the outside is connected to the humidifying module 15. Further, a bypass pipe 35 is provided and connects the compressed air supply pipe 27 to the air discharge pipe 33. The air compressor 17 is driven by a motor 19. The air who humidity is increased by the air compressor 17 is cooled by an intercooler 21, and then supplied to the humidifying module 15.

An air inlet shutoff valve 50 is provided on the air inlet pipe 29, and an air outlet shutoff valve 60 is provided on the air outlet pipe 31. An air pressure control valve 25 is provided in the air outlet pipe 31 between the air outlet 13b of the fuel cell 13 and the air outlet shutoff valve 60. A pressure sensor 37 for measuring outlet air pressure of the fuel cell 13 is provided in the air outlet pipe 31 on the upstream side of the air pressure control valve 25. A pressure sensor 34 for measuring the pressure of compressed air is provided at the outlet of the intercooler 21. A bypass flow control valve 23 is provided in the bypass pipe 35. An atmosphere release pipe 32 provided with an atmosphere release valve 47 is connected between the air outlet shutoff valve 60 and the air outlet 13b linked to the air flow channel of the fuel cell 13.

The air inlet shutoff valve 50 includes a valve main body 50b and a driving unit 50a. The valve body 50b has, in its casing, a valve seat 58 and a valve disc 56. A valve rod 57 is attached to the valve disc 56. The driving unit 50a is partitioned by a diaphragm 54 into two pressure chambers. The upper pressure chamber in FIG. 1 is a valve-closing pressure chamber 51 which is pressurized by the compressed air supplied from the compressed air supply pipe 27 to generate force for driving the valve disc 56 in a valve-closing direction. The lower pressure chamber in FIG. 1 is a valve-opening pressure chamber 52 which is pressurized by the compressed air supplied from the compressed air supply pipe 27 to generate force for driving the valve disc 56 in a valve-opening direction. A driving plate 55 connected to the valve rod 57 to drive the valve disc 56 is attached to the diaphragm 54. A valve-opening spring 53 is provided on the side of the valve-opening pressure chamber 52 of the driving plate 55. This valve-opening spring 53 is attached to the wall surface of the valve-opening pressure chamber 52, and pushes up the driving plate 55 to the side opposite the valve seat 58 to provide force in the valve-opening direction. The air outlet shutoff valve 60 has a configuration similar to the configuration of the air inlet shutoff valve 50, and includes a valve main body 60b and a driving unit 60a. The valve body 60b has a valve seat 68 and a valve disc 66. Owing to a diaphragm 64, the driving unit 60a is provided with a valve-closing pressure chamber 61 which generates force for driving in the valve-closing direction, and a valve-opening pressure chamber 62 which generates force for driving in the valve-opening direction. The driving unit 60a is also provided with a driving plate 65 connected to a valve rod 67 to drive the valve disc 66, and a valve-opening spring 63.

One end of a driving air supply pipe 39 for supplying driving air for the air inlet shutoff valve 50 and the air outlet shutoff valve 60 are connected to the compressed air supply pipe 27. The other end of the driving air supply pipe 39 is branched and connected to an air inlet shutoff-valve-driving air-switching valve 41 and an air outlet shutoff-valve-driving air-switching valve 44. Each of the switching valves 41, 44 has two air supply outlets. One of the air supply outlets is connected to the valve-closing pressure chamber 51, 61 of the shutoff valve 50, 60 by way of conduits 71, 73. The other air supply outlet is connected to the valve-opening pressure chambers 52, 62 of the shutoff valves 50, 60 by way of conduits 72, 74. Further, closing-side discharge valves 42, 45 for discharging the compressed air supplied to the conduits 71, 73 to the atmosphere are provided in the conduits 71, 73 via conduits 75, 77. Open-side discharge valves 43, 46 for discharging the compressed air supplied to the conduits 72, 74 to the atmosphere are provided in the conduits 72, 74 via conduits 76, 78.

The pressure sensor 34 provided for the compressed air supply pipe 27 and the pressure sensor 37 for the air outlet 13b of the fuel cell 13 are connected to a control section 80, so that detection signals are input to the control section 80. The motor 19 of the air compressor 17, the bypass flow control valve 23, the air pressure control valve 25, the air inlet shutoff-valve-driving air-switching valve 41, the air outlet shutoff-valve-driving air-switching valve 44, the closing-side discharge valves 42, 45, the open-side discharge valves 43, 46, and the atmosphere release valve 47 are also connected to the control section 80, and are adapted to operate under the command of the control section 80. The air inlet shutoff-valve-driving air-switching valve 41, the closing-side discharge valve 42, and the open-side discharge valve 43 constitute a valve mechanism included in a valve-driving mechanism of the air inlet shutoff valve 50. The air outlet shutoff-valve-driving air-switching valve 44, the closing-side discharge valve 45, and the open-side discharge valve 46 constitute a valve mechanism included in a valve-driving mechanism of the air outlet shutoff valve 60.

The detailed configuration of the air inlet shutoff valve 50 used in the fuel cell system 11 in the present embodiment is described below with reference to FIG. 2. Elements identical with those in FIG. 1 are denoted by the same reference numerals and repeated description is omitted.

Figure 2:
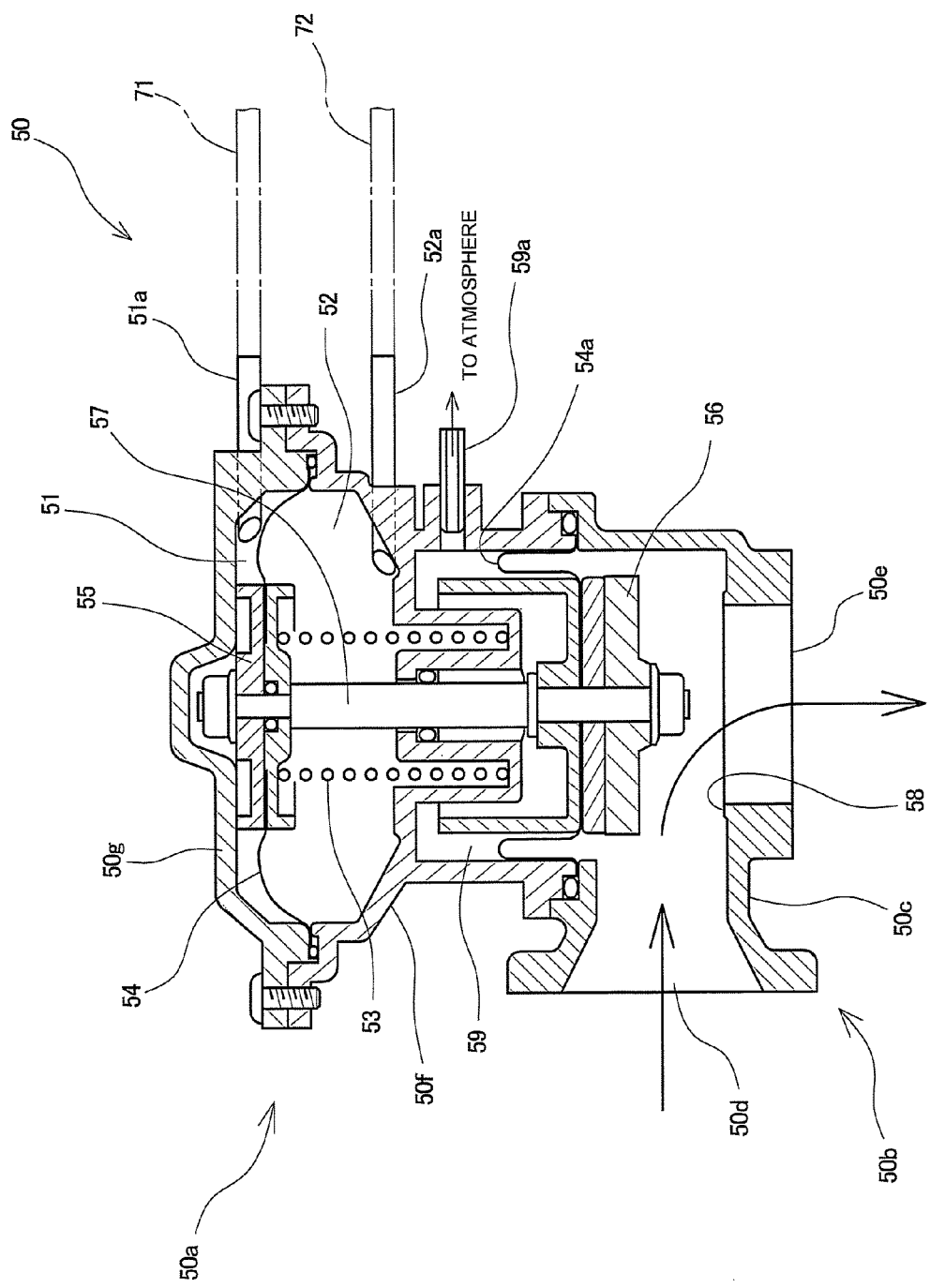
FIG. 2 is a detail sectional view showing a shutoff valve in an open state in the fuel cell system according to the embodiment of the present invention.

As shown in FIG. 2, a casing 50c of the valve body 50b has a valve inlet 50d and valve outlet 50e, and which are both connected to the air inlet pipe 29. The valve seat 58 is provided on the side of the valve outlet 50e of the inner surface of the casing 50c. The valve seat 58 is an annular projection provided on the inner surface of the casing 50c. The upper surface of the valve seat 58 serves as a sealing surface with which the valve disc 56 comes into contact to seal in the air. The driving unit 50a is attached onto the top of the valve body 50b. The driving unit 50a is partitioned into the valve-closing pressure chamber 51 and the valve-opening pressure chamber 52 by the diaphragm 54 which is interposed between a driving unit casing 50f and a driving unit lid 50g.

The driving unit lid 50g forming the valve-closing pressure chamber 51 is provided with a valve-closing pressure chamber air nozzle 51a for putting the driving air in and out of the valve-closing pressure chamber 51. The conduit 71 for supplying the compressed air is connected to the valve-closing pressure chamber air nozzle 51a. Further, the driving unit casing 50f forming the valve-opening pressure chamber 52 is provided with a valve-opening pressure chamber air nozzle 52a for putting the driving air in and out of the valve-opening pressure chamber 52. The conduit 72 for supplying the compressed air is connected to the valve-opening pressure chamber air nozzle 52a.

The driving plate 55 connected to the valve rod 57 to drive the valve disc 56 is attached to the center of the diaphragm 54. The valve-opening spring 53 is provided between the driving plate 55 and the driving unit casing 50f. The valve-opening spring 53 pushes the driving plate 55 in the valve-opening direction. The valve disc 56 attached to the tip of the valve rod 57 is disc-shaped, and a sealing surface for sealing in the air is provided in the part of the valve disc 56 opposite the sealing surface of the valve seat 58. When the sealing surface of the valve disc 56 is in contact with the sealing surface of the valve seat 58, these sealing surfaces come into close contact so that the air can be sealed in.

The valve disc 56 includes a bellows 54a provided between this valve disc 56 and the casing 50c so that the valve disc 56 can move vertically within the casing 50c. The air inlet shutoff valve 50 is partitioned by the bellows 54a into the side of the valve body 50b and the side of the driving unit 50a. An atmosphere chamber 59 which is in communication with the atmosphere through an atmosphere chamber air nozzle 59a is formed in the driving unit casing 50f on the side of the driving unit 50a of the bellows 54a. The air outlet shutoff valve 60 has a configuration similar to that of the air inlet shutoff valve 50.

When the fuel cell system 11 is in operation, the control section 80 outputs a command to switch the air inlet shutoff-valve-driving air-switching valve 41 to an open side, a command to open the closing-side discharge valve 42 for the air inlet shutoff valve 50, and a command to close the open-side discharge valve 43 for the air inlet shutoff valve 50. In response to such commands, the air supply direction of the air inlet shutoff-valve-driving air-switching valve 41 is switched to the valve opening side, the closing-side discharge valve 42 is opened, and the open-side discharge valve 43 is closed. Thus, a flow passage is formed whereby the compressed air is supplied to the valve-opening pressure chamber 52 of the air inlet shutoff valve 50 from the compressed air supply pipe 27 via the air inlet shutoff-valve-driving air-switching valve 41 and the conduit 72. Moreover, the valve-opening pressure chamber 52 is sealed to prevent discharge to the atmosphere of the compressed air which has flowed therein, so that the pressure can be increased.

As the air inlet shutoff-valve-driving air-switching valve 41 is switched to the valve-opening side, the conduit 71 for supplying the compressed air to the valve-closing pressure chamber 51 is in a sealed state, and the closing-side discharge valve 42 provided in the conduit 75 which is connected to the conduit 71 connected to the valve-closing pressure chamber 51 is open. Thus, the valve-closing pressure chamber 51 is in communication with the atmosphere to maintain the atmospheric pressure therein.

Furthermore, as the valve-opening spring 53 provides force in the valve-opening direction to push up, to the opposite the valve seat 58, the driving plate 55 to which the valve disc 56 is connected by the valve rod 57, the air inlet shutoff valve 50 is kept open, as shown in FIG. 2. The air outlet shutoff valve 60 is also kept open by similar operation. Otherwise, when the fuel cell 13 is in operation, the valve can also be kept open by closing the closing-side discharge valves 42, 45 of the shutoff valves 50, 60 to maintain a pressure difference between the valve-closing pressure chambers 51, 61 and the valve-opening pressure chambers 52, 62. Furthermore, in the present embodiment, the shutoff valves 50, 60 are configured as normally-open valves so that the shutoff valves 50, 60 are kept open owing to the pushing force by the valve-opening springs 53, 63 even when the supply of the compressed air to the pressure chambers 51, 52 is stopped.

When the fuel cell system 11 is stopped, the control section 80 outputs a command to switch the air inlet shutoff-valve-driving air-switching valve 41 to a close side, a command to close the closing-side discharge valve 42 for the air inlet shutoff valve 50, and a command to open the open-side discharge valve 43 for the air inlet shutoff valve 50. In response to such commands, the air supply direction of the air inlet shutoff-valve-driving air-switching valve 41 is switched to the valve-closing side, the closing-side discharge valve 42 is closed, and the open-side discharge valve 43 is opened. In accordance with the switching of the valve and the opening and closing of the valves, a flow passage is formed whereby the compressed air is supplied to the valve-closing pressure chamber 51 of the air inlet shutoff valve 50 from the compressed air supply pipe 27 via the air inlet shutoff-valve-driving air-switching valve 41 and the conduit 71. Moreover, the valve-closing pressure chamber 51 is sealed to prevent discharge to the atmosphere of the compressed air which has flowed therein. Thus, the increase of the pressure of the valve-closing pressure chamber 51 is allowed.

Figure 3:
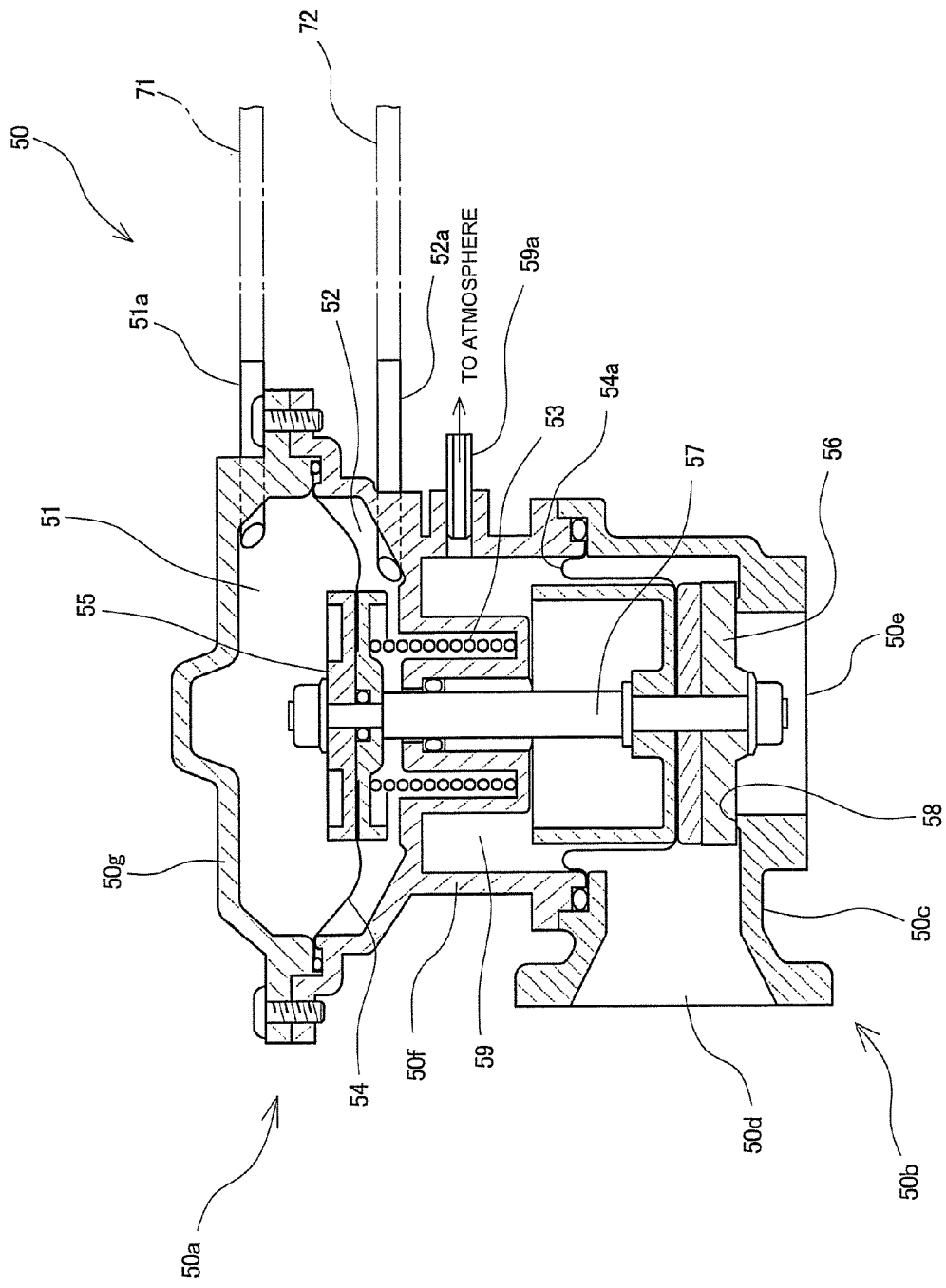
FIG. 3 is a detail sectional view showing the shutoff valve in a closed state in the fuel cell system according to the embodiment of the present invention.

As the air inlet shutoff-valve-driving air-switching valve 41 is switched to the valve-closing side, the conduit 71 for supplying the compressed air to the valve-closing pressure chamber 51 is in a sealed state, and the open-side discharge valve 43 provided in the conduit 76 which is connected to the conduit 72 connected to the valve-opening pressure chamber 52 is open. Thus, the valve-opening pressure chamber 52 is in communication with the atmosphere so that atmospheric pressure is maintained therein. Then, the compressed air from the air compressor 17 in operation is supplied to the valve-closing pressure chamber 51, and force in a direction to close the valve disc 56 is applied to the driving plate 55 of the air inlet shutoff valve 50 by the pressure difference between the pressure chambers 51, 52. Since this force in the valve-closing direction is greater than the force in the valve-opening direction produced by the valve-opening spring 53, the valve disc 56 of the air inlet shutoff valve 50 comes into close contact with the valve seat 58 and is closed, as shown in FIG. 3. When the fuel cell 13 is stopped, the air outlet shutoff valve 60 is also closed by operation similar to that of the air inlet shutoff valve 50.

When the shutoff valves 50, 60 have been closed, the air compressor 17 is still in operation, and the compressed air from the air compressor 17 is being supplied from the compressed air supply pipe 27 to the valve-closing pressure chambers 51, 61 via the driving air supply pipe 39, the switching valves 41, 44 and the conduits 71, 73. Thus, force in the valve-closing direction greater than the force of the valve-opening springs 53, 63 is applied to the valve discs 56, 66 due to the pressure difference between the valve-closing pressure chambers 51, 61 and the valve-opening pressure chambers 52, 62, and the shutoff valves are kept closed.

Then, the control section 80 outputs a command to switch the air inlet shutoff-valve-driving air-switching valve 41 and the air outlet shutoff-valve-driving air-switching valve 44 to the valve open side to open the open-side discharge valves 43, 46. In response to such a command, the switching valves 41, 44 are switched to the valve open side, and the open-side discharge valves 43, 46 are kept open. When the switching valves 41, 44 are switched to the valve open side, the conduits 71, 73 connected to the valve-closing pressure chambers 51, 61 of the switching valves 41, 44 are sealed. As the closing-side discharge valves 42, 45 are kept closed, the valve-closing pressure chambers 51, 61 are sealed so as to hold pressure therein. Consequently, the shutoff valves 50, 60 can also be kept closed by the held pressure even if there is no supply of driving air for opening valves. Subsequently, the control section 80 stops the air compressor 17. Even when the air compressor 17 has been stopped and there is no longer supply of the driving air, the shutoff valves 50, 60 are kept closed as shown in FIG. 3 by the pressure held in the valve-closing pressure chambers 51, 61.

When both the air inlet shutoff valve 50 and the air outlet shutoff valve 60 are closed, the fuel cell 13 is blocked off from the outside air, and air which serves as the oxidizer gas does not flow therein. However, air containing oxygen which serves as the oxidizer remains in the air flow channel in the fuel cell 13. The volume of air decreases due to a reaction between oxygen in the remaining air flow channel and hydrogen remaining in a hydrogen flow channel, so that the pressure in the air flow channel of the fuel cell 13 lowers to negative pressure.

As shown in FIG. 3, if the pressure in the air flow channel in the fuel cell 13 becomes negative, the valve disc 56 of the air inlet shutoff valve 50 of the fuel cell 13 is sucked toward the valve seat 58 located on the side of the air flow channel of the fuel cell 13 by the pressure difference between the atmospheric pressure in the atmosphere chamber 59 and the negative pressure in the air flow channel of the fuel cell 13 applied to the valve outlet 50e. If the negative pressure increases to some degree and the force in the valve-closing direction produced by the suction of the valve disc 56 toward the valve seats 58 is greater than the force in the valve-opening direction produced by the valve-opening spring 53, the force by which the sealing surface of the valve disc 56 comes into contact with the opposite seat surface of the valve seat 58 increases, so that the valve disc 56 can be kept closed by only the negative pressure. Therefore, even if the pressure in the valve-closing pressure chamber 51 lowers due to the leakage of the driving air when the fuel cell 13 is not in operation, the air inlet shutoff valve 50 can be kept closed by the negative pressure in the air flow channel of the fuel cell 13. Moreover, as the air inlet shutoff valve 50 is kept closed by the negative pressure of the fuel cell 13, there is no need for driving force such as electric power to keep the valves closed when the fuel cell 13 is not in operation. As described above, the air outlet shutoff valve 60 can also be kept closed when the valve disc 66 is brought into contact with the valve seat 68 by the negative pressure in the air flow channel of the fuel cell 13 to seal in the air.

In the present embodiment, when the fuel cell 13 is not in operation, even the normally-open valve can be kept closed by the pressure held in the valve-closing pressure chambers 51, 61 and by the force of sucking the valve discs 56, 66 resulting from the negative pressure of the fuel cell 13, which provides the advantage of improving the sealing ability of the shutoff valves 50, 60 diring the fuel cell 13 is not in operation. Moreover, the shutoff valves 50, 60 can be kept closed in such a manner that the valve discs 56, 66 are sucked by the negative pressure in the air flow channel of the fuel cell 13, and the shutoff valves 50, 60 can keep a sealed state even when the driving air leaks when the fuel cell 13 is not in operation, thereby enabling improved sealing ability. Further, there is no need for driving force such as electric power to keep the valves closed, which provides an advantage that the fuel cell can be operated efficiently.

In the present embodiment described above, the sealing ability of the shutoff valves 50, 60 is improved by taking advantage of the air flow channel in the fuel cell 13 being brought under negative pressure by the drop in pressure in the air flow channel of the fuel cell 13 due to a reaction between remaining hydrogen and remaining air after the fuel cell 13 has been stopped. Otherwise, after the shutoff valves 50, 60 are closed, the air flow channel of the fuel cell 13 may be brought under negative pressure by, for example, sucking the air from the air flow channel, and this negative pressure may be used to improve the sealing ability of the shutoff valves 50, 60.

Next described is a start-up operation from the condition in which the pressure in the air flow channel of the fuel cell 13 being stopped is negative in the fuel cell system 11 according to the present embodiment. When the pressure in the air flow channel of the fuel cell 13 is negative, as shown in FIG. 3, the valve disc 56 is in close contact with the valve seat 58 in the air inlet shutoff valve 50 due to the negative pressure, so that the valve inlet 50d is under atmospheric pressure.

The control section 80 shown in FIG. 1, first outputs a command to open the atmosphere release valve 47. In response to this command, the atmosphere release valve 47 is opened. When the atmosphere release valve 47 is open, air comes from the atmosphere release valve 47 through the atmosphere release pipe 32 into the air flow channel of the fuel cell 13 and into an area under negative pressure sealed by the shutoff valves 50, 60, so that the negative pressure in the air flow channel of the fuel cell 13 decreases. As the negative pressure in the air flow channel of the fuel cell 13 decreases, the force of sucking the valve disc 56 toward the valve seat 58 by the negative pressure decreases, and the force applied to the valve disc 56 in the valve-closing direction decreases. On the other hand, the force from the valve-opening spring 53 in the valve-opening direction is applied to the driving plate 55 attached to the valve rod 57 to which the valve disc 56 is connected. When the force of the valve-opening spring 53 in the valve-opening direction which is applied to the valve disc 56 is greater than the force in the valve-closing direction resulting from the negative pressure, the valve disc 56 moves in the valve-opening direction, and the seat surfaces of the valve seat 58 and the valve disc 56 are separated from each other, so that the air can no longer be sealed in. Then, air also flows into the air flow channel of the fuel cell 13 from the valve inlet 50d, which further decreases the negative pressure and decreases the force in the valve-closing direction. As a result, greater force in the valve-opening direction is applied to the valve disc 56 of the air inlet shutoff valve 50, and the air inlet shutoff valve 50 is closed. The air outlet shutoff valve 60 is also closed as described above.

Even when the valve disc 56 and the valve seat 58 of the air inlet shutoff valve 50 are firmly fixed together when the fuel cell is not in operation, the air flow channel of the fuel cell 13 is brought under atmospheric pressure by opening the atmosphere release valve 47, so that there can be substantially no force in the valve-closing direction resulting from the negative pressure in the air flow channel of the fuel cell 13. Thus, the valve can be opened even when the pressure applied to the valve-opening pressure chamber 52 is low.

As described above, the advantage of the present embodiment lies in improvement of the easiness of opening of the shutoff valves 50, 60 even if the pressure in the air flow channel of the fuel cell 13 is negative when the fuel cell is not in operation.

The invention claimed is:

1. A fuel cell system, comprising:
 a fuel cell which generates electricity by an electrochemical reaction between a fuel gas and an oxidizer gas; and
 a shutoff valve provided between an oxidizer gas flow channel in the fuel cell and the atmosphere, the shutoff valve including an atmosphere chamber in fluid communication with the atmosphere,
 wherein the shutoff valve includes a valve seat, and a valve disc which comes into contact with the valve seat to seal in the oxidizer gas,
 the valve disc in a closed state being sucked toward the valve seat by negative pressure, lower than atmospheric pressure in the oxidizer gas flow channel in the fuel cell, between the atmosphere chamber and an outlet of the valve.

2. The fuel cell system according to claim 1, further comprising:
 a valve open/close driving mechanism attached to the shutoff valve, the valve open/close driving mechanism opening or closing the shutoff valve by a driving source to be supplied, the valve open/close driving mechanism keeping the shutoff valve open when the supply of the driving source is stopped.

3. The fuel cell system according to claim 2, wherein:
 the valve open/close driving mechanism includes a valve-opening pressure chamber and a valve-closing pressure chamber which are supplied with the oxidizer gas, the valve open/close driving mechanism being configured to open and close the shutoff valve by a pressure difference between the pressure chambers.

4. The fuel cell system according to claim 1, wherein:
 shutoff valves, each of which has a configuration substantially similar to that of the shutoff valve of claim 1, are provided in all passages between the oxidizer gas flow channel in the fuel cell and the atmosphere.

5. The fuel cell system according to claim 1, further comprising:
 an atmosphere release valve which is provided between the oxidizer gas flow channel in the fuel cell and the shutoff valve and which decreases the negative pressure in the oxidizer gas flow channel in the fuel cell.

6. The fuel cell system according to claim 5, wherein when the fuel cell is started, the shutoff valve is opened after the atmosphere release valve is opened.

* * * * *